United States Patent
Billiot et al.

(10) Patent No.: US 9,732,820 B2
(45) Date of Patent: Aug. 15, 2017

(54) LOAD COMPENSATOR HAVING TENSION SPRING ASSEMBLIES CONTAINED IN A TUBULAR HOUSING

(71) Applicant: Oil States Industries, Inc., Arlington, TX (US)

(72) Inventors: Walter Billiot, Houma, LA (US); Joseph Angeron, Houma, LA (US); Danton Gutierrez-Lemini, Grand Prairie, TX (US); Chris Chiasson, Houma, TX (US); Eric Luke, Hurst, TX (US)

(73) Assignee: OIL STATES INDUSTRIES, INC., Arlington, TX (US)

( * ) Notice: Subject to any disclaimer, the term of this patent is extended or adjusted under 35 U.S.C. 154(b) by 12 days.

(21) Appl. No.: 14/656,612

(22) Filed: Mar. 12, 2015

(65) Prior Publication Data
US 2015/0259181 A1  Sep. 17, 2015

Related U.S. Application Data

(60) Provisional application No. 61/952,808, filed on Mar. 13, 2014.

(51) Int. Cl.
*F16F 9/00* (2006.01)
*F16F 13/00* (2006.01)
(Continued)

(52) U.S. Cl.
CPC .............. *F16F 13/00* (2013.01); *B66C 13/02* (2013.01); *B66C 13/04* (2013.01); *F16F 3/0876* (2013.01); *F16F 2236/06* (2013.01)

(58) Field of Classification Search
CPC .. F16F 2236/06; F16F 1/46; F16F 1/40; F16F 3/08
(Continued)

(56) References Cited

U.S. PATENT DOCUMENTS 2,293,936 A  8/1942  Crooke
2,801,843 A  8/1957  MacCluney
(Continued)

FOREIGN PATENT DOCUMENTS

EP  0508587 A2  10/1992
FR  2945982 A1  12/2010
(Continued)

OTHER PUBLICATIONS

Huyge, Kevin, International Search Report and Written Opinion of the International Searching Authority, International Application No. PCT/IB2015/051827, Jul. 2, 2015, 14 pages, European Patent Office, Rijawijk, The Netherlands.
(Continued)

*Primary Examiner* — Nicholas J Lane
(74) *Attorney, Agent, or Firm* — Polsinelli PC

(57) ABSTRACT

In view of the above, there has been described a load compensator including one or more tension spring assemblies that are contained within a tubular housing when tension from a load is applied to the tension spring assemblies. When the load compensator includes more than one tension spring assembly, the tension spring assemblies are mechanically connected to each other in series and stacked in-line with each other in the housing. In a preferred construction, each of the tension spring assemblies includes elastomeric tension elements mounted between two disks, and the tubular housing includes a tube having threaded ends and caps that screw onto the tube.

18 Claims, 11 Drawing Sheets

(51) Int. Cl.
    *B66C 13/02* (2006.01)
    *F16F 3/087* (2006.01)
    *B66C 13/04* (2006.01)

(58) Field of Classification Search
    USPC .............................................. 267/69, 73, 74
    See application file for complete search history.

(56) References Cited

U.S. PATENT DOCUMENTS

| | | | |
|---|---|---|---|
| 2,854,154 A | 9/1958 | Hepinstall | |
| 2,903,208 A | 9/1959 | Everitt | |
| 2,915,306 A | 12/1959 | Hickman | |
| 2,946,466 A | 7/1960 | Weiner | |
| 3,189,196 A | 6/1965 | Carl et al. | |
| 3,306,600 A * | 2/1967 | Roux | B60D 1/182 |
| | | | 267/128 |
| 3,371,919 A | 3/1968 | Minor et al. | |
| 3,388,070 A | 6/1968 | Born et al. | |
| 3,401,972 A | 9/1968 | Walsh | |
| 3,480,255 A | 11/1969 | Wiggins | |
| 3,591,022 A | 7/1971 | Polyakov et al. | |
| 3,991,837 A | 11/1976 | Crickmer | |
| 4,025,055 A | 5/1977 | Strolenberg | |
| 4,051,922 A | 10/1977 | Sukle | |
| 4,076,284 A | 2/1978 | Herbert et al. | |
| 4,168,781 A | 9/1979 | Bryan, Jr. | |
| 4,180,171 A | 12/1979 | Cunningham et al. | |
| 4,182,104 A | 1/1980 | Sukle | |
| 4,236,695 A | 12/1980 | Morrison | |
| 4,271,970 A | 6/1981 | Miller et al. | |
| 4,348,015 A | 9/1982 | Domer | |
| 4,354,608 A | 10/1982 | Wudtke | |
| 4,428,568 A | 1/1984 | McNatt et al. | |
| 4,544,137 A | 10/1985 | Johnson | |
| 4,593,885 A | 6/1986 | Hackman et al. | |
| 4,627,885 A | 12/1986 | Arlt | |
| 4,892,444 A | 1/1990 | Moore | |
| 4,957,279 A | 9/1990 | Thorn | |
| 4,991,366 A | 2/1991 | Teramura et al. | |
| 5,028,194 A | 7/1991 | Robinson | |
| 5,054,963 A | 10/1991 | Williamsson | |
| 5,101,905 A | 4/1992 | Arlt et al. | |
| 5,209,302 A | 5/1993 | Robichaux et al. | |
| 5,209,461 A | 5/1993 | Whightsil, Sr. | |
| 5,259,597 A | 11/1993 | Fredheim | |
| 5,268,404 A | 12/1993 | Mowrey | |
| 5,299,790 A | 4/1994 | Whightsil, Sr. | |
| 5,330,165 A | 7/1994 | van Goubergen | |
| 5,366,324 A | 11/1994 | Arlt et al. | |
| 5,421,468 A | 6/1995 | Wright | |
| 5,433,423 A | 7/1995 | Whightsil, Sr. | |
| 5,573,463 A | 11/1996 | Arlt | |
| 5,613,665 A | 3/1997 | Lund | |
| 5,641,248 A | 6/1997 | Arlt, III | |
| 5,713,710 A | 2/1998 | Strong et al. | |
| 5,772,188 A | 6/1998 | Lund | |
| 5,842,312 A | 12/1998 | Krumme et al. | |
| 5,862,638 A | 1/1999 | Holland et al. | |
| 5,951,061 A | 9/1999 | Arlt, III et al. | |
| 6,067,735 A | 5/2000 | Kallenberger | |
| 6,082,947 A | 7/2000 | Adamson | |
| 6,116,565 A | 9/2000 | Reinke et al. | |
| 6,141,919 A | 11/2000 | Robinson | |
| 6,174,584 B1 | 1/2001 | Keller et al. | |
| 6,190,091 B1 | 2/2001 | Byle | |
| 6,209,842 B1 | 4/2001 | Anderson et al. | |
| 6,328,294 B1 | 12/2001 | Palinkas | |
| 6,364,274 B1 | 4/2002 | Omi et al. | |
| 6,382,603 B1 | 5/2002 | Monson et al. | |
| 6,394,435 B1 * | 5/2002 | Monson | F16F 7/123 |
| | | | 267/141.1 |
| 6,505,574 B1 | 1/2003 | Naud et al. | |
| 6,926,467 B1 | 8/2005 | Andersen et al. | |
| 6,932,325 B1 | 8/2005 | Selcer et al. | |
| 6,932,326 B1 | 8/2005 | Krabbendam | |
| 6,935,262 B2 | 8/2005 | Roodenburg et al. | |
| 6,964,552 B1 | 11/2005 | Krabbendam | |
| 7,097,169 B2 | 8/2006 | Mueller | |
| 7,367,464 B1 | 5/2008 | Agostini et al. | |
| 7,415,783 B2 | 8/2008 | Huffman et al. | |
| 7,670,228 B2 | 3/2010 | Matsumoto et al. | |
| 7,731,157 B2 | 6/2010 | Davidson | |
| 7,798,471 B2 | 9/2010 | Christopher | |
| 8,235,231 B2 | 8/2012 | Schneider et al. | |
| 8,251,148 B2 | 8/2012 | von der Ohe | |
| 8,265,811 B2 | 9/2012 | Kyllingstad | |
| 8,297,597 B2 | 10/2012 | Dalsmo et al. | |
| 2010/0308289 A1 | 12/2010 | Dalsmo et al. | |
| 2010/0314168 A1 | 12/2010 | Williams | |
| 2011/0100279 A1 | 5/2011 | Roodenburg et al. | |
| 2011/0253661 A1 | 10/2011 | Smith et al. | |
| 2011/0260126 A1 | 10/2011 | Willis | |
| 2012/0025156 A1 | 2/2012 | Roodenburg et al. | |
| 2012/0156003 A1 | 6/2012 | Battersby et al. | |
| 2012/0217063 A1 | 8/2012 | Roodenburg et al. | |
| 2014/0263142 A1 | 9/2014 | Billiot et al. | |

FOREIGN PATENT DOCUMENTS

| | | |
|---|---|---|
| GB | 554989 A | 7/1943 |
| GB | 1058793 A1 | 2/1967 |
| GB | 2259747 A1 | 3/1993 |
| WO | WO8303814 A1 | 11/1983 |
| WO | 9627055 A1 | 9/1996 |
| WO | WO03083323 A1 | 10/2003 |
| WO | WO2014151825 A1 | 9/2014 |

OTHER PUBLICATIONS

Offshore Pedestal-mounted Cranes, API Specification 2C, Seventh Edition, Mar. 1, 2012, pp. i-vii, 1, 61, 23-31 and 61, and ERRATA of Mar. 2013, one page, American Petroleum Institute, Washington, DC.
Specification for Offshore Pedestal Mounted Cranes, API Specification 2C, Sixth Edition, Mar. 2004, pp. 1-2, 11-13, American Petroleum Institute, Washington, DC.
Neupert, Jorg et al., A Heave Compensation Approach for Offshore Cranes, 2008 American Control Conference, Westin Seattle Hotel, Seattle, Washington, Jun. 11-13, 2008, pp. 538-543, American Automatic Control Council, Troy, NY.
Nautilus® Marine Cranes, Pedestal Cranes and Services, Brochure, 2006, 4 pages, Oil States Industries, Inc., Arlington, TX.
The Cranemaster calculation sheet, 2006, Jan. 31, 2013, three pages, Crane and Rig Inc, Nisku, Alberta, Canada.

* cited by examiner

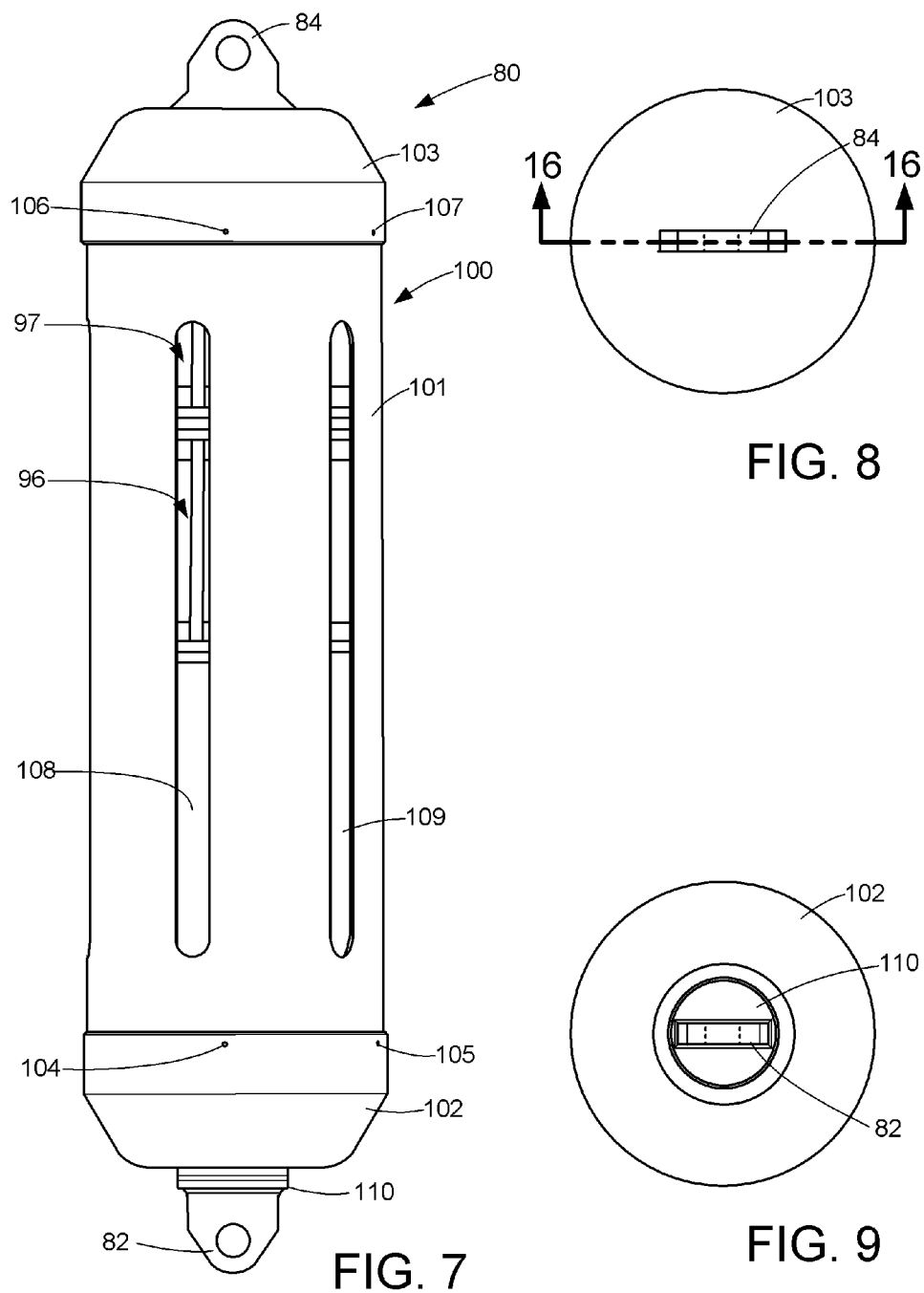

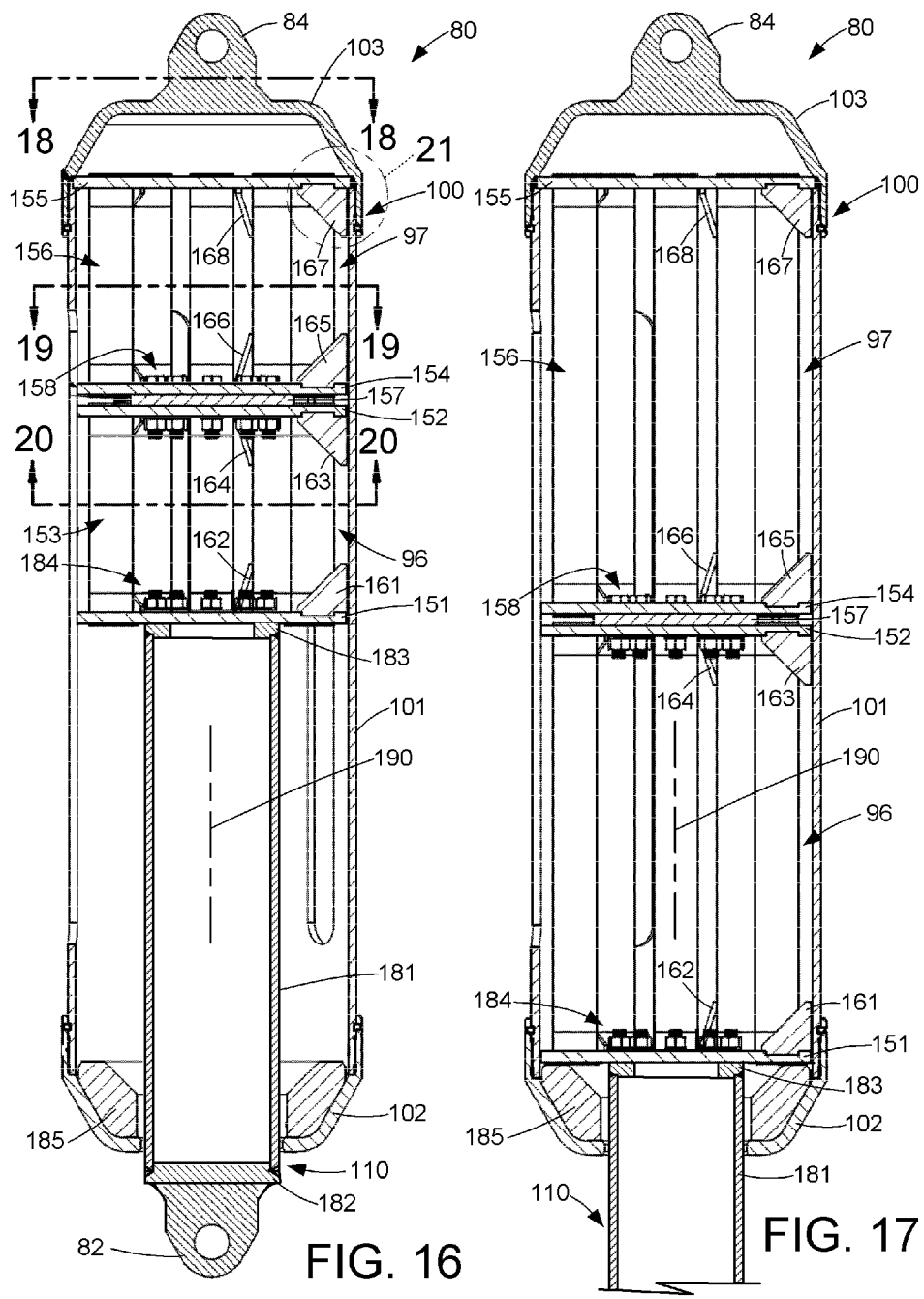

LOAD COMPENSATOR HAVING TENSION SPRING ASSEMBLIES CONTAINED IN A TUBULAR HOUSING

RELATED APPLICATIONS

The present application claims the benefit of Walter Billiot et al. U.S. Provisional Application Ser. 61/952,808 filed Mar. 13, 2014, incorporated herein by reference.

FIELD OF THE INVENTION

The present invention relates to tension spring assemblies.

BACKGROUND OF THE INVENTION

Elastomeric springs have been used in a number of applications to provide an opposing force of compression, torsion, or tension, in response to an applied displacement. The amount of opposing force provided by the elastomeric spring in response to a unit of displacement is known as the spring rate. Elastomeric springs have also been designed to put the elastomer of the spring in tension, shear, or compression in response to the applied displacement. By selecting whether the elastomer is put in tension, shear, or compression, elastomeric springs have been designed for rather linear spring rates and for non-linear spring rates. For example, compression of the elastomer typically results in a non-linear spring rate having a progressive increase in restoring force per unit of displacement as the elastomer is compressed.

Some examples of applications using elastomeric springs include exercise equipment (Whightsil, Sr. U.S. Pat. No. 5,209,461), drive-line couplings (Arlt U.S. Pat. Nos. 4,627,885 and 5,753,463), energy absorbers (Robinson U.S. Pat. No. 6,141,919), flexible pipe joints (Herbert et al. U.S. Pat. No. 4,076,284), and riser tensioner systems (Arlt et al. U.S. Pat. Nos. 5,366,324 and 5,641,248).

Offshore cranes are subject to load variations when making an off-board lift of a payload from a floating vessel such as a supply vessel or materials barge. Severe sea conditions cause heave motion of the floating vessel, and have the effect of placing a transient load upon the crane in excess of the weight of the payload when the payload is lifted off the floating vessel.

Severe sea conditions are considered in industry standards for offshore cranes. For example, the American Petroleum Institute Specification for Offshore Pedestal Mounted Cranes, API-2C, Seventh Edition, March 2012, requires the crane manufacturer to account for sea conditions by using a Dynamic Factor (Cv). The crane capacity for off-board lifts must be de-rated by the Cv. The minimum Cv allowed by the API-2C specification is 1.4 for cranes installed on floating applications and 1.33 for cranes installed on fixed structures. In some cases, Cv will range from 2 to 4. For example, a Cv of 2.8 means that the crane lifting capability at a particular radius from the pedestal mount is one-half of what it could be at the API-2C minimum for the same radius. The Cv is calculated at spaced radii over the range of radii for the crane, and it is a function of three variables. The first variable is a "significant wave height" specified by the customer for the particular marine environment that the crane is designed to operate in. An increase in the "significant wave height" has the effect of raising Cv and reducing the safe working load of the crane. The second variable is the crane geometry. The third variable is crane stiffness taking into account all elements from the hook through the pedestal structure. See, for example, FIG. 8 on page 61 of the API-2C specification, and Section 5.4 on pages 23-31 of the API-2C specification.

Heave compensation of a crane is a method of compensating for the load variations due to heave motion of the crane or the support from which the crane is lifting the payload. Heave compensation attempts to reduce the load variations by raising or lowering the payload to counteract the effect of the heave motions. For example, the objective is for the payload to track a desired reference trajectory in an earth fixed frame without being influenced by heave motions. Heave compensation has employed passive components, active components, and combinations of active and passive components. The passive components have included springs and counter-weights that react to an increase in loading from the payload by reducing the payload acceleration, so that the crane tends to apply a more constant lifting force upon the payload. The active components have included sensors that measure motion of the crane, the payload, or its support, and hydraulic cylinders or winch motors that are actuated in response to the sensor signals in order to counteract the effect of the heave motion. See, for example, Jorg Neupert et al., A Heave Compensation Approach for Offshore Cranes, 2008 American Control Conference, Westin Seattle Hotel, Seattle, Wash., Jun. 11-13, 2008, pages 538-543, American Automatic Control Council, Troy, N.Y.

One kind of passive heave compensator that has been used in the industry has hydraulic or gas cylinders attached to a load block between the hook of the crane and the payload in order to limit dynamic loads. See, for example, Hackman et al. U.S. Pat. No. 4,593,885.

SUMMARY OF THE DISCLOSURE

The present disclosure describes a load compensator using a series combination of in-line tension spring assemblies stacked within a common tubular housing. This configuration permits a variety of load compensators of different sizes and aspect ratios to be assembled using many instances of the same component parts. This reduces the manufacturing cost because the cost per part decreases with the number of parts that are made. Also there is a reduction in the cost of maintaining an inventory of parts for manufacture, repair, or replacement because of the reduction in the number of different kinds of parts.

For example, each tension spring assembly includes a plurality of elastomeric tension elements mechanically connected in parallel. Tension spring assemblies of different diameters can be made by including a different number of the same kind of elastomeric tension element. Any number of the tension spring assemblies can be fastened to each other so that they are in line with each other and stacked in a common tubular housing so as to share the tubular housing. Moreover, the fasteners and the housing can be configured for rapid assembly and disassembly for replacement or re-use of the parts. Such an elastomeric load compensator provides a convenient, reliable, and relatively lightweight mechanism for load compensation in comparison to the mechanical spring, counterweight, and hydraulic mechanisms that have been used for load compensation. Such an elastomeric load compensator may provide a rather linear spring rate and some shock and vibration adsorption.

Such an elastomeric load compensator is especially suited for load compensation of a crane. The elastomeric load compensator reduces the crane stiffness and reduces the Dynamic Factor (Cv) in such a way as to significantly increase the off-board crane load ratings for a given crane model. In most cases, this allows for the use of a smaller crane model for a given customer or project requirement. The smaller crane model has lower design requirements for the crane pedestal support structure, which is a significant consideration in the platform design for the customer. This reduces the platform construction costs for the customer. The production costs for the smaller crane model are also lower. In most cases, there is an average cost difference of approximately ten percent between models. The elastomeric load compensator may reduce the appropriate model size by one to three models, depending on the requirements, for an average reduced production cost of ten to thirty percent.

In accordance with one aspect, the present disclosure describes a load compensator. The load compensator includes a tubular housing, and at least two tension spring assemblies adapted for connection to a load and mechanically connected to each other in series so that tension from the load is applied to each of the tension spring assemblies and the load compensator provides an elongation to the load that includes a sum of elongations from each of the tension spring assemblies. The tension assemblies are stacked in-line with each other in the tubular housing.

In accordance with another aspect, the present disclosure describes a load compensator having a tubular housing, and at least one tension spring assembly having a first end adapted for connection to a load and a second end mechanically connected to the tubular housing so that tension from the load is applied to the tension spring assembly. At least one tension spring assembly is disposed within the tubular housing and the first end of the at least one tension spring assembly slides against an inner surface of the tubular housing when the at least one tension spring assembly elongates as the tension from the load is applied to the tension assembly. The tubular housing has a fixed length greater than a length of the at least one tension spring assembly when the at least one tension spring assembly has a maximum elongation under a maximum amount of tension from the applied load so that the at least one tension spring assembly is contained within the tubular housing under the maximum amount of tension from the applied load.

BRIEF DESCRIPTION OF THE DRAWINGS

Additional features and advantages of the present disclosure will be described below with reference to the drawings, in which:

FIG. 7 is a front view of the elastomeric load compensator in a vertical orientation;

FIG. 8 is a top view of the elastomeric load compensator of FIG. 7;

FIG. 9 is a bottom view of the elastomeric load compensator of FIG. 7;

FIG. 16 is a cross-section view along section line 16-16 in FIG. 8;

FIG. 17 is a cross-section view corresponding to FIG. 16 but for the case of maximum applied tension;

Figure 1:
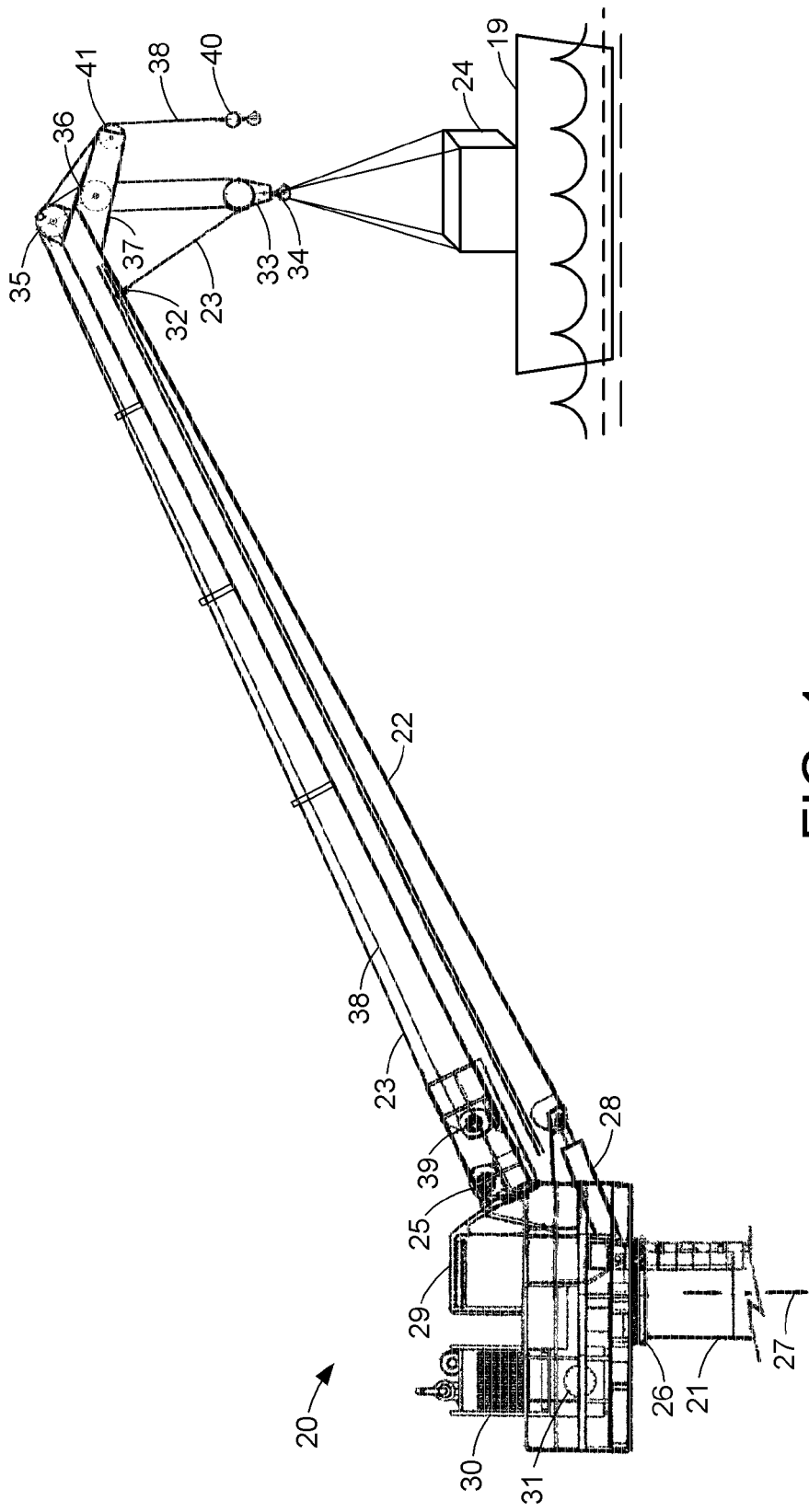
FIG. 1 is a side view of a conventional pedestal-mounted offshore crane having a box-frame boom.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

FIG. 1 shows an offshore crane 20 that is susceptible to heave loads when performing an off-board lift of a payload 24 from a floating vessel 19. In general, the crane 20 has a base 21, a boom 22 mounted to the base 21, a hoist rope 23 descending from the boom for attachment to the payload 24, and a hoist mechanism 25 mounted to the base 21 or to the boom 22 for applying tension to the hoist rope 23 to lift the payload 24.

In particular, the crane 20 is a pedestal-mounted offshore crane having a box-frame boom 22. A specific example of such a crane is a NAUTILUS® brand of pedestal marine crane Model 180B-70 sold by Oil States Industries, Inc. of Arlington, Tex., through its related companies Oil States Skagit Smatco, LLC, Oil States Industries (Thailand) Ltd, and Oil States Industries (India) Pvt. Ltd. The base 21 is a cylindrical pedestal, and the boom 22 is mounted to the pedestal via a swing-circle assembly 26. The swing circle assembly 26 rotates the boom 22 about a central vertical axis 27 of the pedestal 21. In addition, the boom 22 is pivotally mounted to the swing-circle assembly 26 so that a pair of 12 inch (30.5 centimeter) diameter hydraulic cylinders 28 may erect the boom 22 to a desired angle of inclination. For example, at a zero angle of inclination, the boom 22 is horizontal and provides a radius of seventy feet (21 meters) from the pedestal axis 27 to a main hook 34. In this fashion, the jib 37 is positioned over a first location to pick up the payload 24, and then positioned over a second location to drop off the payload.

The swing-circle assembly 26 also carries an operator's cab 29, a diesel engine 30, and a hydraulic pump 31 driven by the diesel engine. The hydraulic pump 31 powers the swing-circle assembly 26, the hydraulic cylinders 28, the hoist mechanism 25, and an auxiliary hoist mechanism 39.

In the crane 20, the hoist rope 23 is a main hoist wire rope, and the hoist mechanism 25 is a main hoist winch. A live end of the main hoist wire rope 23 is secured to the main hoist winch 25, which draws in the main hoist wire rope 23 to lift the payload 24. A dead end 32 of the main hoist wire rope 23 is secured to the boom 22. A hoist block 33 carrying the main hook 34 attaches the main hoist wire rope 23 to the payload 24. For example, the hoist block 33 provides a maximum lift of 25 short tons (22.7 metric tons). The main hoist wire rope 23 runs over a boom point sheave assembly 35 and over a sheave assembly 36 in a jib 37 extending from the boom 22. The combination of the sheave assembly 36 and the hoist block 33 organizes the main hoist wire rope 23 into a four part reeving so that the tension on the main hoist wire rope 23 is about one-quarter of the tension applied on the main hook 34 from the payload 24.

The crane 20 also has an auxiliary hoist wire rope 38. A live end of the auxiliary hoist wire rope 38 is secured to an auxiliary hoist winch 39 mounted to the boom 22. A dead end of the auxiliary hoist wire rope 38 is secured to an overhaul ball 40. The auxiliary hoist wire rope 38 runs over the boom point sheave assembly 35 and over a sheave 41 at the distal end of the jib 37.

Figure 2:
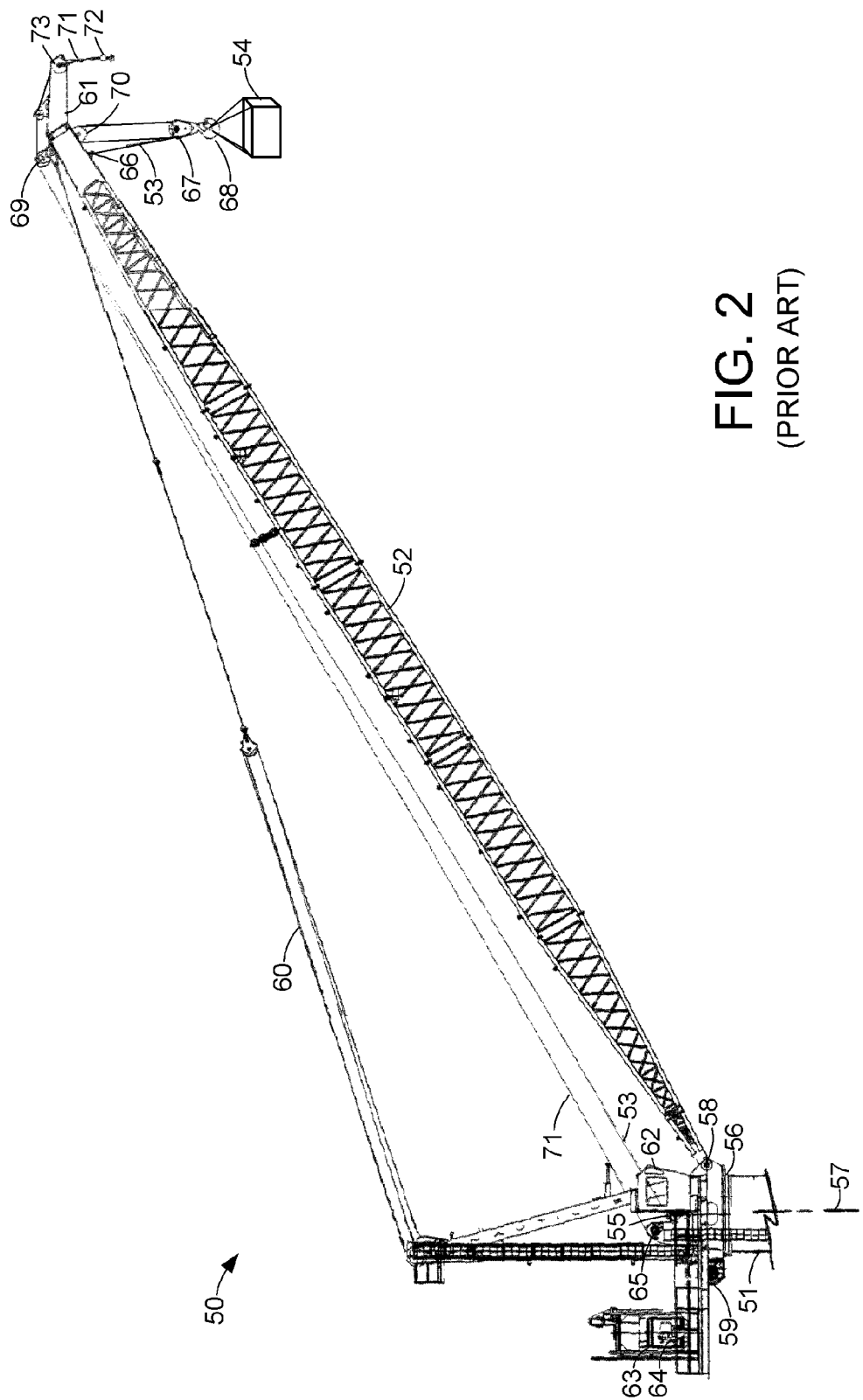
FIG. 2 is a side view of a conventional pedestal-mounted offshore crane having a lattice-frame boom.

FIG. 2 shows a second kind of offshore crane 50 that also is susceptible to heave loads when performing an off-board lift. In general, the crane 50 has a base 51, a boom 52 mounted to the base 51, a hoist rope 53 descending from the boom for attachment to a payload 54, and a hoist mechanism 55 mounted to the base 51 for applying tension to the hoist rope 53 to lift the payload 54.

In particular, the crane 50 is a pedestal-mounted offshore crane having a lattice-frame boom 52. A specific example of such a crane is a NAUTILUS® brand of pedestal marine crane Model 1400L.5-170 sold by Oil States Industries, Inc. of Arlington, Tex. The lattice frame of the boom 52 is efficient for the large size of the crane 50. The base 51 is a cylindrical pedestal, and the boom 52 is mounted to the pedestal via a swing-circle assembly 56. The swing circle assembly 56 rotates the boom 52 about a central vertical axis 57 of the pedestal 51. In addition, a heel pin 58 pivotally mounts the boom 52 to the swing-circle assembly 56 so that a boom hoist winch 59 may erect the boom 52 to a desired angle of inclination. For example, at a zero angle of inclination, the boom 52 is horizontal and provides a radius of 177 feet (54 meters) from the pedestal axis 57 to a main hook 68. The boom hoist winch 59 reels in a boom hoist wire rope 60 to raise the boom 52. In this fashion, a jib 61 extending from the boom 52 is positioned over a first location to pick up the payload 54, and then positioned over a second location to drop off the payload.

The swing-circle assembly 56 also carries an operator's cab 62, a diesel engine 63, and a hydraulic pump 64 driven by the diesel engine. The hydraulic pump 64 powers the swing-circle assembly 56, the hoist mechanism 55, the boom host winch 59, and an auxiliary hoist mechanism 65.

In the crane 50, the hoist rope 53 is a main hoist wire rope, and the hoist mechanism 55 is a main hoist winch. A live end of the main hoist wire rope 53 is secured to the main hoist winch 55, which draws in the main hoist wire rope 53 to lift the payload 54. A dead end 66 of the main hoist wire rope 53 is secured to the boom 52. A hoist block 67 carrying the main hook 68 attaches the main hoist wire rope 53 to the payload 54. For example, the hoist block 67 provides a maximum lift of 50 short tons (45.4 metric tons). The main hoist wire rope 53 runs over a boom point sheave assembly 69 and over a sheave assembly 70. The combination of the sheave assembly 70 and the hoist block 67 organizes the main hoist wire rope 53 into a four part reeving so that the tension on the main hoist wire rope 53 is about one-quarter of the tension applied on the main hook 68 from the payload 54.

The crane 50 also has an auxiliary hoist wire rope 71. A live end of the auxiliary hoist wire rope 71 is secured to an auxiliary hoist winch 65 mounted to the base 51. A dead end of the auxiliary hoist wire rope 71 is secured to an overhaul ball 72. The auxiliary hoist wire rope 71 runs over the boom point sheave assembly 69 and over a sheave 73 at the distal end of the jib 61.

It is desired to use an elastomeric load compensator for load compensation of a crane, such as a crane of the kind shown in FIG. 1 or FIG. 2. The load compensator may handle the (sometimes very high) liftoff velocity required to avoid payload re-contact with the deck of the floating vessel, as well as provide compensation for deck heave. The re-contact scenario involves the deck moving down at the moment the payload is picked up off the deck. The payload then has a certain amount of time to get out of the way before the deck comes back and hits it. This time allowance dictates a hoisting velocity. The elastomeric load compensator of the present disclosure has been designed to resist the "impact" from the upward-moving hook meeting the downward-moving payload, rather than typical heave applications, where load re-contact is not such a concern.

The heave compensation reduces the crane stiffness and reduces the Dynamic Factor (Cv) in such a way as to significantly increase the off-board crane load ratings for a given crane model. In most cases, this allows for the use of a smaller crane model for a given customer or project requirement. The smaller crane model has lower design requirements for the crane support structure, which is a significant consideration in the platform design for the customer. This reduces the platform construction costs for the customer.

An elastomeric load compensator is a compact, convenient, reliable, and relatively lightweight mechanism for load compensation in comparison to the mechanical spring, counterweight, and hydraulic mechanisms that have been used for crane heave compensation. The elastomeric load compensator described below is configured for placement at various locations on the crane, and may provide a rather linear spring rate and shock and vibration absorption as appropriate for the particular location of the load compensator.

The elastomeric load compensator can be added when needed to an existing offshore crane already installed on an offshore platform, or it can be added in anticipation of occurrences when it would be needed, or it can be added when an offshore crane is installed on an offshore platform, or it can be added on-shore to crane components when the crane components are manufactured.

Figure 3:
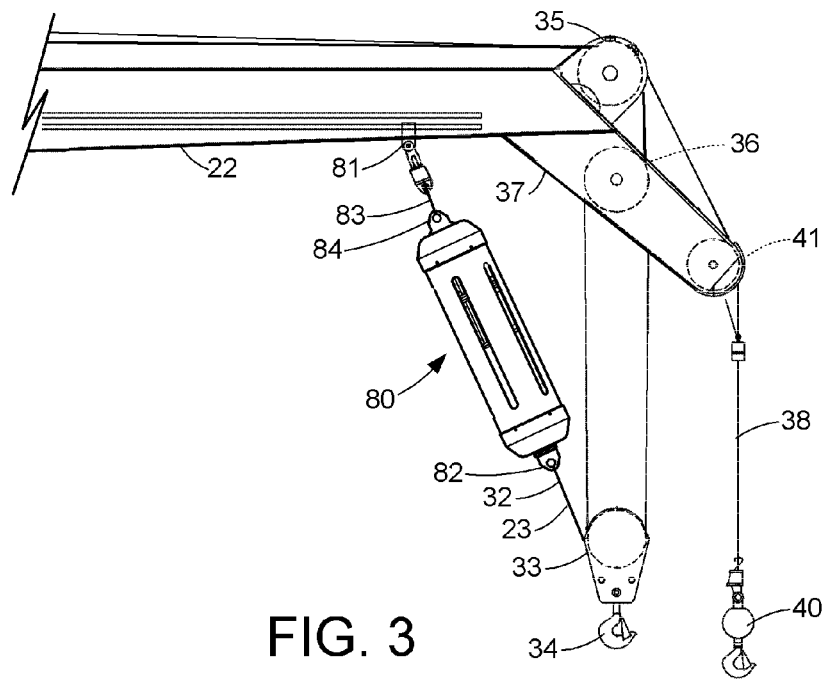
FIG. 3 shows an elastomeric load compensator installed in the crane of FIG. 1 between the boom and a dead end of a main hoist rope.

FIG. 3 shows an elastomeric load compensator 80 configured for quick mounting and dismounting from an offshore crane. In the example of FIG. 2, the elastomeric load compensator 80 has been mounted to the crane 20 of FIG. 1, although the elastomeric load compensator can be mounted just as easily in the same way to different kinds of cranes, such as the crane 50 in FIG. 2.

As shown in FIG. 3, the dead end 32 of the main hoist wire rope 23 has been removed from a load cell mount 81 on the underside of the boom 22 and attached to a first steel eyelet 82 of the elastomeric load compensator 80. A link 83 has been added to attach a second steel eyelet 84 of the elastomeric load compensator 80 to the load cell mount 81. Therefore tension in the main hoist wire rope 23 is applied to the elastomeric load compensator 80, and the elastomeric load compensator reacts to the applied tension by elongating so that the distance between the first eyelet 82 and the second eyelet 84 increases in proportion to the applied tension. This elongation in proportion to the applied tension tends to keep the tension in the main hoist wire rope 23 more constant when heave loads are applied. The overall effect of the elastomeric load compensator 80 is to provide passive heave compensation by reducing the crane stiffness from the main hook 34 through the pedestal structure.

For example, the elastomeric load compensator 80 has a spring rate of 892 pounds force per inch (1.52 kilo Newtons/cm), a maximum extension of about 20 inches (51 cm) for a maximum rated tension of about 17.4 kips (77.4 kilo Newtons), an outer diameter of about 14 inches (36 cm), and a length of about 56 inches (142 cm) in the absence of applied tension. It should be clear to anyone with reasonable skills in the art that other design requirements than those listed in the previous example may be accommodated by changing the number of elastic springs in each spring assembly, the number of spring assemblies, the dimensions of the elastic springs in one or more assemblies, or the elastomeric material of the elastic springs. For example, one could double the spring rate of the elastomeric load compensator of the previous example and cut in half its maximum extension by using only one elastic spring assembly of the same characteristics as each one of the two assemblies assumed used in the example. In like fashion, one could reduce the spring rate to, say, two thirds that of the elastomeric load compensator in the example, and increase its maximum extension to one hundred and fifty percent, by connecting to it a third elastomeric spring assembly in series.

Figure 4:
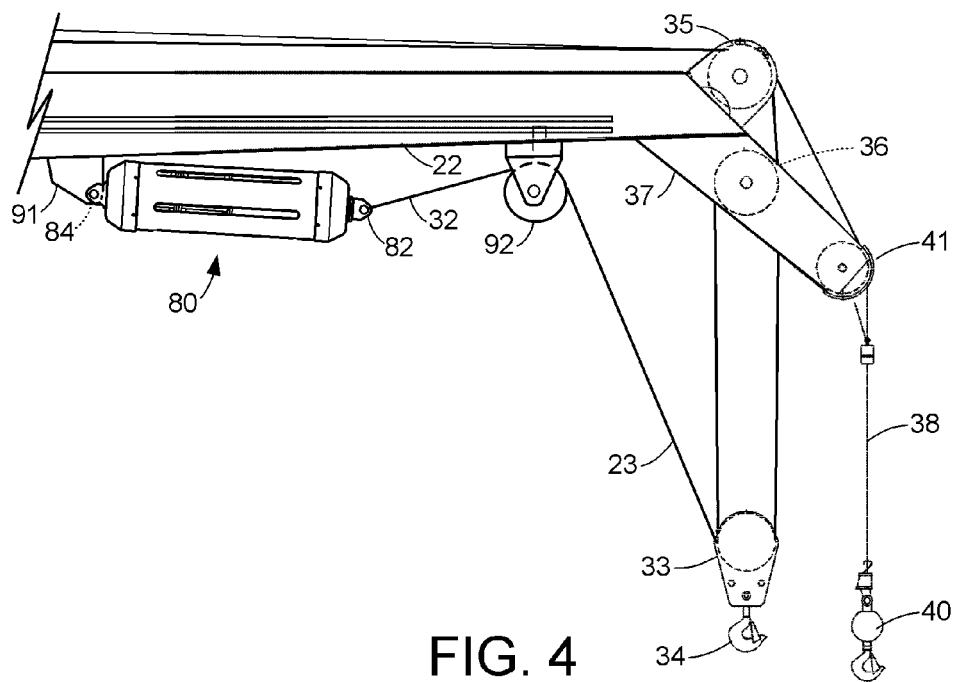
FIG. 4 shows a more permanent mounting of the elastomeric load compensator under the boom of the crane of FIG. 1.

FIG. 4 shows a more permanent mounting of the elastomeric load compensator 80 to the boom 22. A bracket 91 is welded or bolted to the underside of the boom 22, and the second eyelet 84 of the elastomeric load compensator 80 is pinned to the bracket 91. An idler sheave 92 is secured to the underside of the boom 22 at the original attachment location (in FIG. 3) of the dead end 32 of the main hoist wire rope 23. The main hoist wire rope 23 is strung over the idler sheave 92, and again the dead end 32 of the main hoist wire rope 23 is attached to the first eyelet 82 of the elastomeric load compensator 80.

The assembly in FIG. 4 has a number of advantages over the configuration in FIG. 3. In FIG. 4, the elastomeric load compensator 80 is mounted at a smaller radius from the pedestal axis (27 in FIG. 1) so that maximum static load of the crane is reduced less by the weight of the elastomeric load compensator 80. In FIG. 4, the length of the elastomeric load compensator 80 does not reduce the appropriate minimum distance of the hook 34 from the jib 37. In addition, the amount of space between the first mounting eyelet 82 and the sheave 92 provides a visual indication to persons near the crane of available capacity of the elastomeric load compensator for absorbing heave loads.

Figure 5:
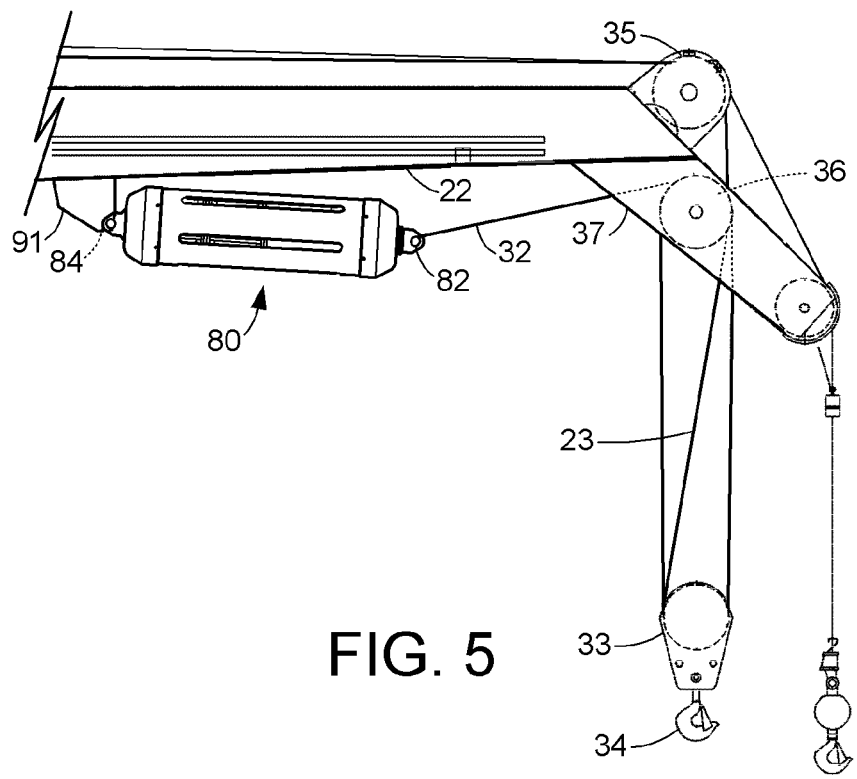
FIG. 5 shows an alternative way of using the elastomeric load compensator mounted under the boom of the crane of FIG. 1.
Figure 6:
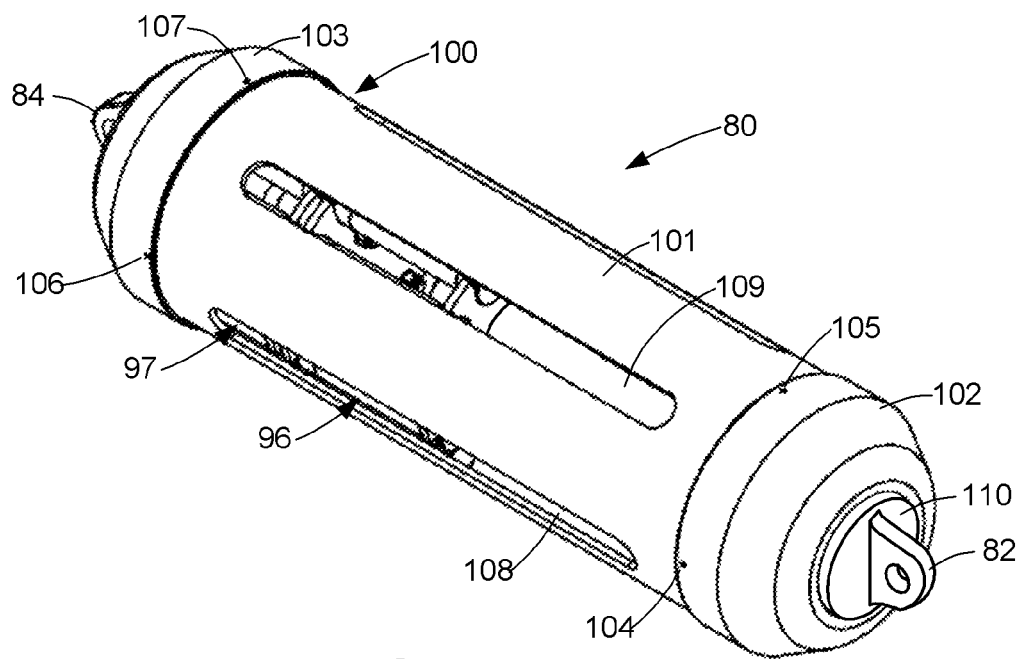
FIG. 6 is an isometric view of the elastomeric load compensator.

FIG. 5 shows an alternative way of using the elastomeric load compensator 80 mounted under the boom 22. In this example, the sheave 92 of FIG. 4 has been eliminated. Instead, the main hoist wire rope 23 loops back over the sheave assembly 36, and from the sheave assembly 36, the dead-end 32 of the main hoist wire rope is attached to the first eyelet 82 of the elastomeric load compensator 80.

The different ways of using the elastomeric load compensator 80 as shown in FIGS. 3, 4, and 5 all have the device in line with a single part of main hoist wire rope 23. This is in contrast to a load compensator that would be inserted between the hook 34 and a payload. The in-line mounting as shown in FIGS. 3, 4, and 5 is more convenient for customers, and is more challenging to implement with a conventional load compensator such as one using a gas cylinder. The in-line mounting does not leave a device hanging in the way of the people trying to rig the load to the crane hook. The in-line mounting does not limit the hook drop height of the crane. In-line mounting is more challenging for non-elastomeric devices because in-line mounting requires much more flexibility than hook mounting because the in-line mounting has more mechanical advantage since it acts on fewer parts of line. Due to the mechanical advantage, less required force is put on the load compensator, but the load compensator provides more travel or displacement.

Gas cylinders do not deal well with large displacements because their force versus displacement response is not linear. This is due to the fact that adiabatic but non-reversible gas cylinder expansion/compression follows a polytropic pressure vs. volume curve: $P_1V_1^n=P_2V_2^n$, where $V=Area*Length$. Thus $P_2=P_1(V_1/V_2)^n=P_1(L_1/L_2)^n$, where $L_2$ is actually $L_1$+displacement. The exponent n is a number somewhere between 1.1 and 2. Therefore this results in a non-linear force response. In comparison, the elastomer response for elongation is much more linear. Because a gas cylinder does not have linear force vs. displacement, it is much more difficult for the manufacturer to create an inline device with ratings that conform to the API 2C standard, because the standard only accounts for linear (spring-like) behavior in the official formula for Cv. Cv=1+Vr Sqrt[k/g/SWLLH]−k is the effective composite vertical stiffness of everything between the payload and the earth. The standard has no concept of the non-linear response of the gas-cylinder type devices.

FIGS. 6, 7, 8, and 9 show further details of the elastomeric load compensator 80. The elastomeric load compensator 80 includes a pair of in-line tension spring assemblies 96, 97 mechanically connected in series so that tension from the load is applied to each of the tension spring assemblies and the load compensator provides an elongation to the load that includes a sum of elongations from each of the tension spring assemblies. The tension spring assemblies 96, 97 are enclosed and stacked in-line with each other in a common tubular housing 101. The housing 101 is comprised of a steel tube 101 and first and second steel caps 102, 103 secured to the tube 101 at opposite ends of the tube. For example, the ends of the tube 101 are threaded, and the caps 102, 103 screw on to the tube 101, and set screws 104, 105, 106, 107 prevent the caps from unscrewing from the tube 101. The tube 101 has longitudinal slots 108, 109 spaced about its circumference in order to reduce the weight of the tube and to permit visual inspection of the elongation and condition of tension elements in the tension spring assemblies 96, 97.

A steel extension 110 protrudes from the housing 100 through the first cap 102 when tension is applied to the two eyelets 82, 84. The first eyelet 82 is disposed on the exposed end of extension 110, and the second eyelet 84 is disposed on the second cap 103. For example, the eyelets 82, 84 are made from steel plate, and welded to the extension 110 and the second cap 103, respectively. Inside the housing 100, the other end of the extension 110 is mechanically connected to the first tension spring assembly 96, the first spring assembly 96 is mechanically connected to the second tension spring assembly 97, and the second tension spring assembly 97 is mechanically connected to the housing 101. Tension applied to the eyelets 82, 84 pulls the exposed end of the extension 110 outwardly from the housing 100, elongates each of the tension spring assemblies 96, 97, and translates the entire first tension spring assembly 96 in a longitudinal direction with respect to the tube 101 toward the first cap 102 and away from the second cap 103.

Each tension spring assembly 96, 97 includes a multiplicity of tension springs mechanically connected in parallel with each other. Therefore elongation of the tension spring assembly is applied to each of the tension springs in the tension spring assembly, and the tension springs in the tension spring assembly provide a restoring force upon the load that is the sum of restoring forces from the tension springs in the tension spring assembly. The parallel connection of multiple tension springs provides redundancy and enables load compensators of various sizes and load capacities to be constructed using multiple instances of one tension spring component. In a preferred construction, the tension springs are instances of an elastomeric tension element.

Figure 11:
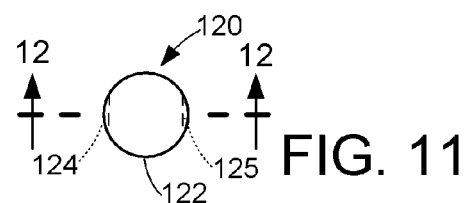
FIG. 11 is a top view of the elastomeric tension element.
Figures 10, 12:
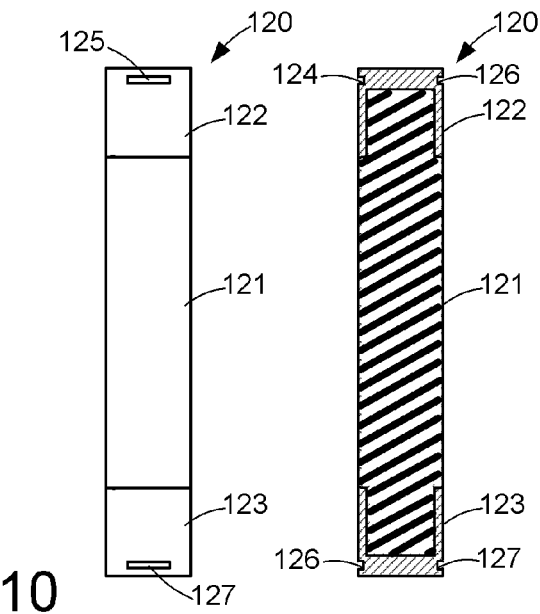
FIG. 10 is a side view of an elastomeric tension element used in the elastomeric load compensator.
FIG. 12 is a longitudinal cross-section of the elastomeric tension element along section line 12-12 in FIG. 11.

A single elastomeric tension element 120 is shown in FIGS. 10, 11, and 12. The elastomeric tension element 120 is elongated and can be cylindrical or prismatic, depending on specific needs of cross section, flexibility, or means of attachment. For example, the elastomeric tension element 120 shown in FIGS. 10, 11, and 12 is cylindrical. The elastomeric tension element 120 is comprised of an elongated elastomer body 121 and metal, composite or plastic end caps 122 and 123. Each end cap 122, 123 has a respective cavity filled with elastomer of the body so that the end cap is bonded to the elastomer of the body.

The elastomeric tension element 120 is made by an injection molding process in which the internal surfaces of the end caps are coated with an epoxy rubber-to-metal or composite bonding agent, the end caps are inserted into ends of a mold having a conforming cavity, elastomer mixed with a vulcanizing agent is injected into the mold, and the elastomer is cured under heat and pressure. The elastomer, for example, is natural or nitrile butadiene rubber, and the vulcanizing agent is sulfur. A suitable metal-to-rubber bonding agent, for example, is Chemlock 205/TY-PLY-BN produced by Lord Corporation, 2000 W. Grandview Blvd., P.O. Box 10038, Erie, Pa. See Mowrey U.S. Pat. No. 5,268,404. Another suitable bonding agent is Thixon P-6-EF primer and 532-EF adhesive produced by Rohm and Haas Company, 100 Independence Mall West, Philadelphia, Pa. 19106.

Figure 13:
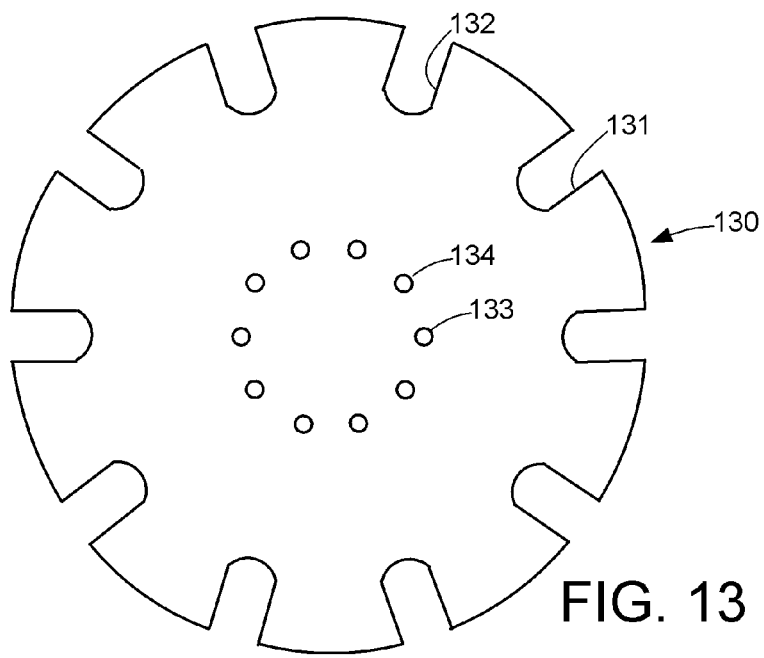
FIG. 13 is a top view of a slotted plate used for receiving a circular array of elastomeric tension elements to construct a tension spring assembly.

For applying tension to the tension element 120, the end caps 122, 123 are configured for attachment with supporting plates, rings or rails, for example the end caps 122, 123 are provided with peripheral grooves 124, 125, 126, 127 configured for engagement with slotted plates, rings or rails. For example, FIG. 13 shows a slotted steel plate 130 in the shape of a disk having slots 131, 132, etc. for receiving the end caps of a circular array of the tension elements. The slotted plate 130 also has a central array of holes 133, 134, etc. for receiving fasteners for securing the slotted plate 130 to an eyelet, extension, or another slotted plate of a neighboring tension spring assembly.

Figure 14:
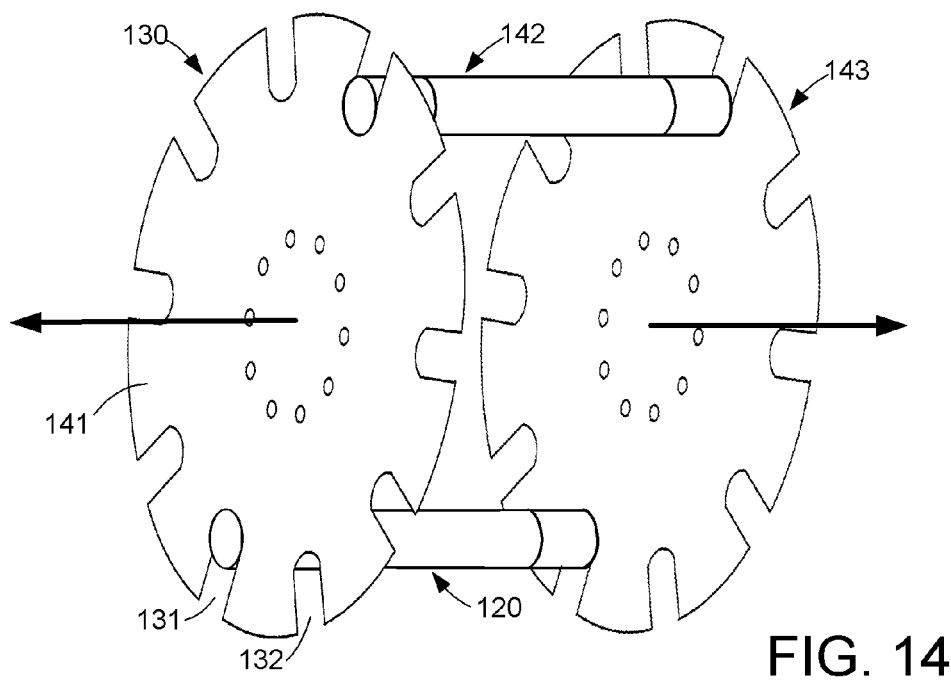
FIG. 14 is an oblique view showing generally how the slotted plate of FIG. 13 is used for receiving the elastomeric tension elements to construct the tension spring assembly.

For example, as shown in FIG. 14, a pair of elastomeric tension elements 120, 142 have been received in the slotted plate 130. A second slotted steel plate 143 in the shape of a disk is aligned in a coaxial fashion with the first slotted plate 130 to receive opposite end caps of the elastomeric tension elements 120, 142. Therefore the elastomeric tension elements 120, 142 become extended when tension is applied to the slotted plates 130, 143 in the axial direction to pull the two slotted plates away from each other. In effect, the elastomeric tension elements 120, 142 are mechanically connected in parallel to the pair of slotted plates 130, 143, so that the elastomeric tension elements share the same displacement.

Figure 15:
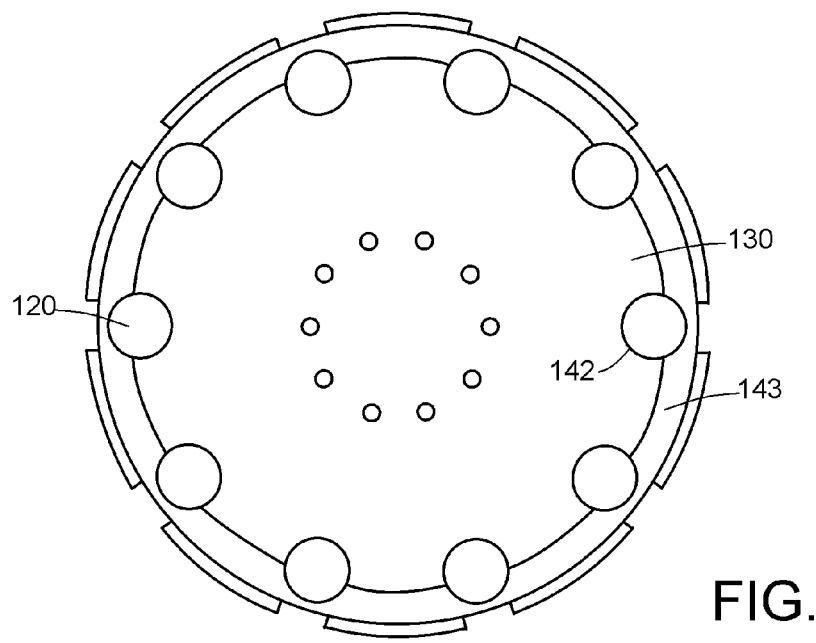
FIG. 15 is a top view of a tension spring assembly constructed from the slotted plates of FIG. 13.
Figure 18:
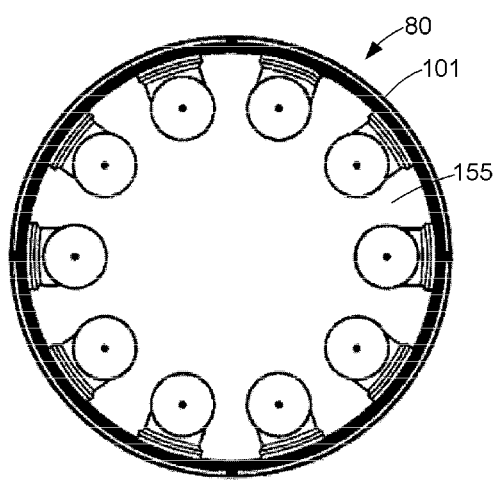
FIG. 18 is a cross-section view along line 18-18 in FIG. 16.
Figure 19:
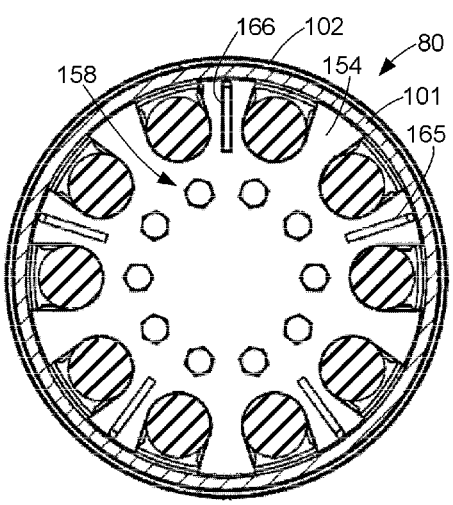
FIG. 19 is a cross-section view along line 19-19 in FIG. 16.
Figure 20:
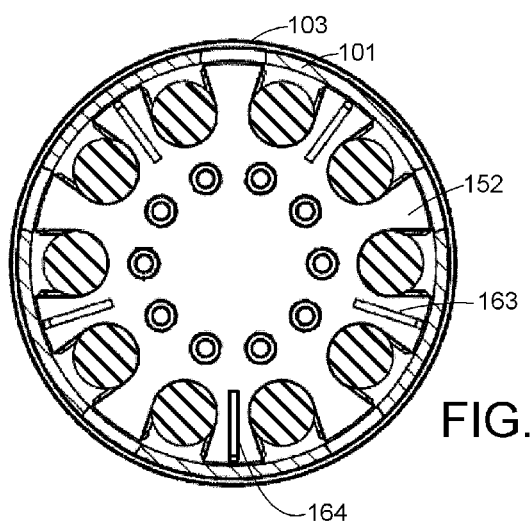
FIG. 20 is a cross-section view along line 20-20 in FIG. 16.

In practice, as shown in FIG. 15, a respective elastomeric extension element is received in each slot of the slotted plate 130 so that the slotted plate carries a circular array of elastomeric extension elements. In this example, the elastomeric tension elements are retained in the slotted plate 130 by a flat ring 143 fastened to the slotted plate.

FIG. 16 shows a lateral cross-section of the elastomeric load compensator 80 for case of no tension applied to the elastomeric load compensator. FIG. 17 shows a similar cross-section for the case of maximum tension applied to the elastomeric load compensator 80. In the elastomeric load compensator 80, the first tension spring assembly 96 includes a first pair of slotted steel plates 151, 152 carrying a first circular array 153 of elastomeric tension elements. The second tension spring assembly 97 includes a second pair of slotted steel plates 154, 155 carrying a second circular array 156 of elastomeric tension elements.

The two tension spring assemblies 96, 97 are mechanically connected in series to reduce the stiffness of the elastomeric load compensator 80 and increase the maximum displacement of the elastomeric load compensator 80 without increasing the lengths of the elastomeric tension elements 153, 156. A steel spacer plate 157 is disposed between the slotted plates 152, 154 to provide clearance between the caps of the elastomeric tension elements of the first array 153 and the elastomeric tension elements of the second array 156. Bolts 158 are inserted between the slotted plates 152, 154 and the spacer plate 157 to fasten the slotted plates 152, 154 together. Alternatively, to eliminate the use of bolts 158, and spacer plate 157, and thus simplify assembly, a single, thicker slotted plate can be used instead of the two slotted plates 152 and 154, as the means of connecting adjacent elastomeric spring assemblies.

The tension spring assembly 96 slides against the inner surface of the tube 101 of the tubular housing 100 when the tension spring assembly 96 elongates as tension from a load is applied to the tension spring assembly 96. The tubular housing 100 has a fixed length greater than the length of the two tension spring assemblies 96, 97 when the two tension spring assemblies have a maximum elongation under a maximum amount of tension from the applied load so that the tension spring assemblies are contained within the tubular housing 100 under the maximum amount of tension from the applied load. Moreover, the first cap 102 of the housing 100 limits elongation of the two tension spring assemblies 96, 97 when a load in excess of a maximum amount of tension is applied the two tension assemblies so that the two tension spring assemblies are contained within the tubular housing when a load in excess of the maximum amount of tension is applied to the two tension spring assemblies. In this case of a load in excess of the maximum rated load, the slotted plate 151 moves a bit further than that shown in FIG. 16 to abut against the first cap 102 of the housing, so that tension from the load in excess of the maximum rated load is applied to the tube 101 of the housing 100.

Steel fins 161, 162, 163, 164, 165, 166, etc. are secured to the slotted plates 151, 152, 154 and these fins reinforce the slotted plates and help to align the slotted plates with the tube 101 during assembly. For example, the fins are welded to the slotted plates. Similar fins 167, 168, etc. are also secured to the slotted plate 155 in order to reinforce the slotted plate 155 and help align the slotted plate 155 during assembly. In contrast to the slotted plates 151, 152, 154, which have a clearance fit with the tube 101, the slotted plate 155 has a diameter substantially greater than the inner diameter of the tube 101.

Another way of keeping the slotted plates 151, 152, 154, aligned with the tube 101 would be to use one or more guide rods that would pass through bushings mounted to one or more the slotted plates 151, 152. 154. Each guide rod would be perpendicular to the slotted plates 151. 152. 154 and parallel to the axis 190 of the tube 101. For example, each guide rod could be mounted to the slotted plate 155 and could extend from the slotted plate 155 to the cap 102, and each guide rod could pass through a respective bushing mounted to each of the slotted plates 151, 152, 154. For example, one guide rod could be used that would be aligned coaxial with the axis 190 of the tube 101. In another arrangement, a plurality of guide rods could be equally spaced around a circle centered on the axis 190. For example the plurality of guide rods could be at a radius from the axis 190 of about one half to three quarters of the radius of the tube 101.

The extension 110 is comprised of a steel tube 181, a steel plug 182 carrying the first eyelet 82, and a steel ring 183. For example, the plug 182 and the ring 183 are welded to the tube 181, and studs 184 are embedded in the ring 183 for fastening the slotted plate 151 to the extension 110.

For some applications, the extension 110 could be omitted, and the first eyelet 82 could be fastened directly to the slotted plate 151. For example, this could be done in a configuration in which a wire rope would extend from the housing 100 along the longitudinal axis of the housing.

As shown in FIG. 17, under maximum rated tension, the slotted plate 151 reaches an annular crush pad 185 seated in the first cap 102 of the housing 100. The crush pad 185 provides a permanent record of whether or not the threshold of maximum rated tension has been exceeded. For example, the crush pad 185 is made of hard plastic foam, and the crush pad is bonded with adhesive to the first cap 102. The amount of any tension in excess of the maximum rated tension is indicated by a permanent reduction in the thickness of the crush pad 185 along the longitudinal axis 190 of the housing 100.

Figure 21:
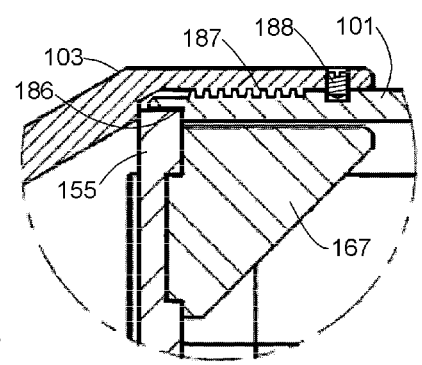
FIG. 21 is an enlarged view of region 21 in FIG. 16.

As shown in FIG. 21, the slotted plate 155 is captured in an annular seat 186 machined into the neighboring end of the tube 101, and held in this annular seat by contact with the second cap 103 of the housing. The second cap 103 is secured to the tube 101 by stub ACME threads 187 on the inner circumference of the second cap and on the outer circumference of the neighboring end of the tube 101. A set screw 188 keeps the second cap 103 from unscrewing from the tube 101.

During assembly, the slotted plate 151 is fastened to the extension 181 before the elastomeric tension elements 96 are assembled onto the slotted plate. Also, the slotted plates 152, 154 and the spacer plate 157 are fastened together before the elastomeric tension elements 96, 97 are assembled onto the slotted plates 152, 154. After the elastomeric tension elements 96, 97 are assembled into the slotted plates 151, 152, 154, 155, the stacked tension spring assemblies 96, 97 are slipped into the tube 101. For example, the spring assembles 96, 97 are assembled in an upright orientation, as shown in FIG. 16, and the first cap 102 carrying the crush pad 185 is screwed onto the tube 101, and then the stacked tension spring assemblies 96, 97 and the extension 181 are lowered into the tube until the slotted plate 155 becomes seated in the upper end of the tube. Then the second cap 103 is screwed onto the upper end of the tube, and finally the set screws are tightened.

It should be apparent that load compensator 80 as shown in the drawing figures could be modified in various ways to accommodate different loads or mounting arrangements. For example, the length of the tube 101 could be increased to accommodate three or more instances of the tension spring assembly 96, 97. For example, a third tension spring assembly could be bolted between the first spring assembly 96 and the second spring assembly 97 using an additional instance of the spacer plate or disk 157. For example, instead of using the second eyelet 84 to mechanically connect the load compensator 80 to the boom of a crane, the tube 101 could be mechanically connected directly to the boom by brackets welded to the tube and bolted or welded to the boom.

Figure 22:
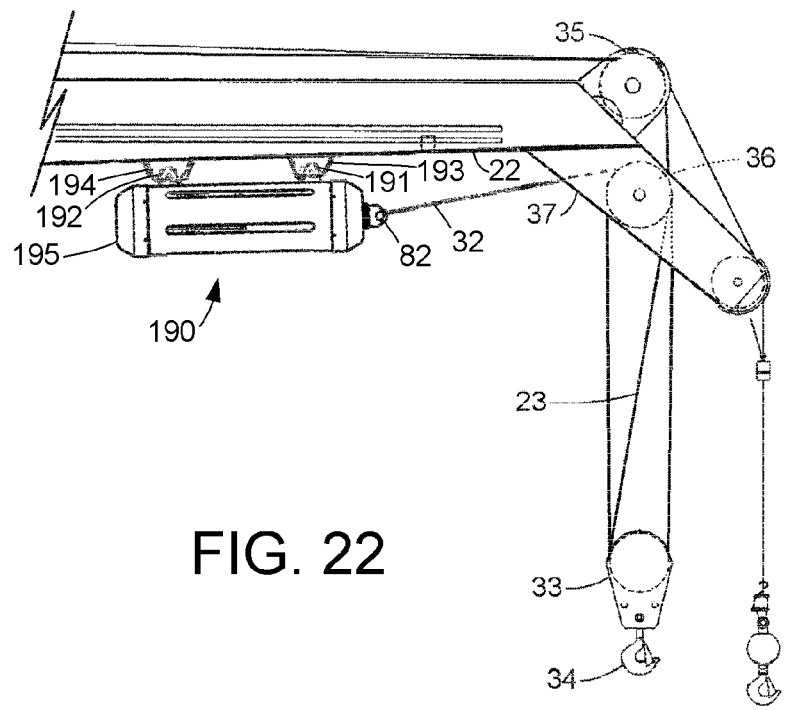
FIG. 22 shows another way of mounting an elastomeric load compensator under the boom of the crane of FIG. 1.
Figure 23:
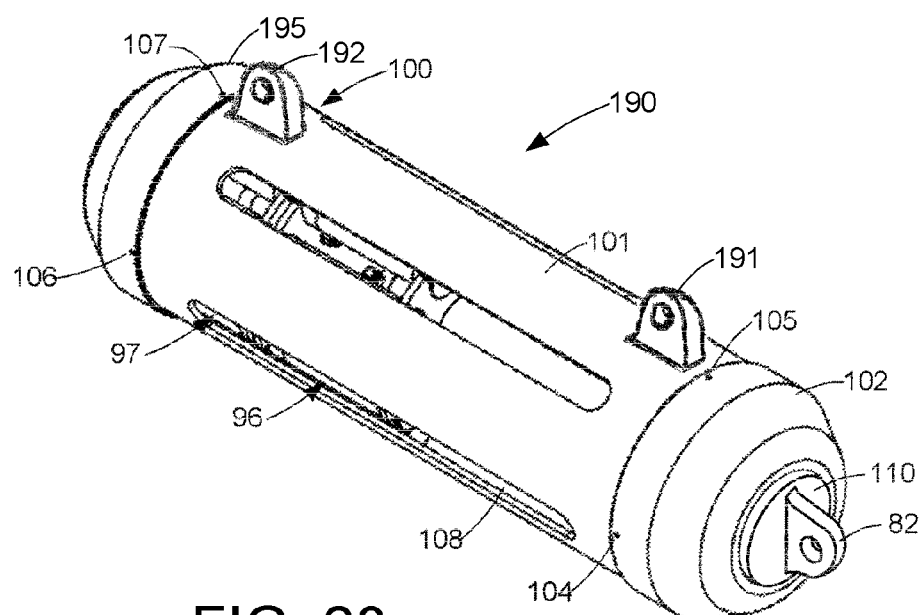
FIG. 23 is an isometric view of the load compensator introduced in FIG. 22.

For example, FIG. 22 shows a load compensator 190 that is similar to the load compensator 80 described above but has two eyelets 191, 192 for mounting the load compensator to the boom 22 in such a way that the load compensator is kept parallel to the boom. In this example, the two eyelets 191, 192 are pinned to respective brackets 193 and 194 bolted or welded to the boom 22 of the crane of FIG. 1.

As further shown in FIG. 22, the load compensator 190 differs from the load compensator 80 described above because the eyelets 191, 192 have been welded to the top of the tube 101 at the ends of the tube 101. Also the load compensator 190 has a second end cap 195 that does not have an eyelet welded to it.

Figure 24:
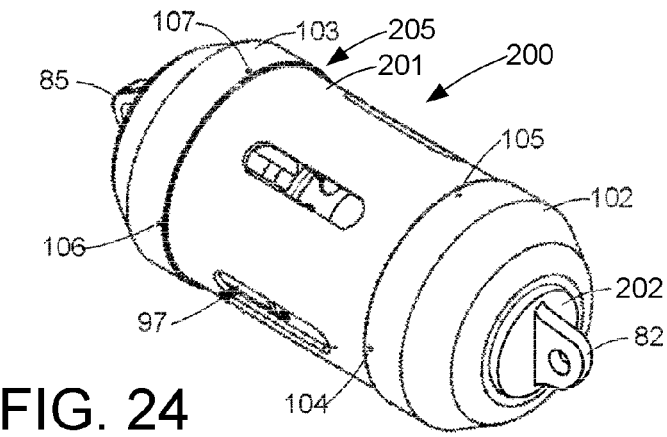
FIG. 24 is an isometric view of a shortened load compensator having a single tension spring assembly.
Figure 25:
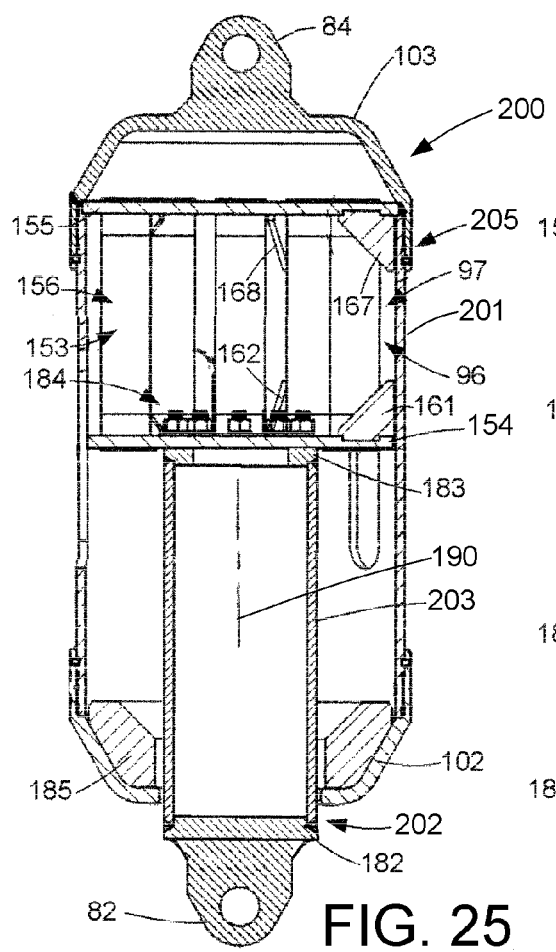
FIG. 25 is a lateral cross-section view of the shortened load compensator of FIG. 24 in the absence of applied tension.
Figure 26:
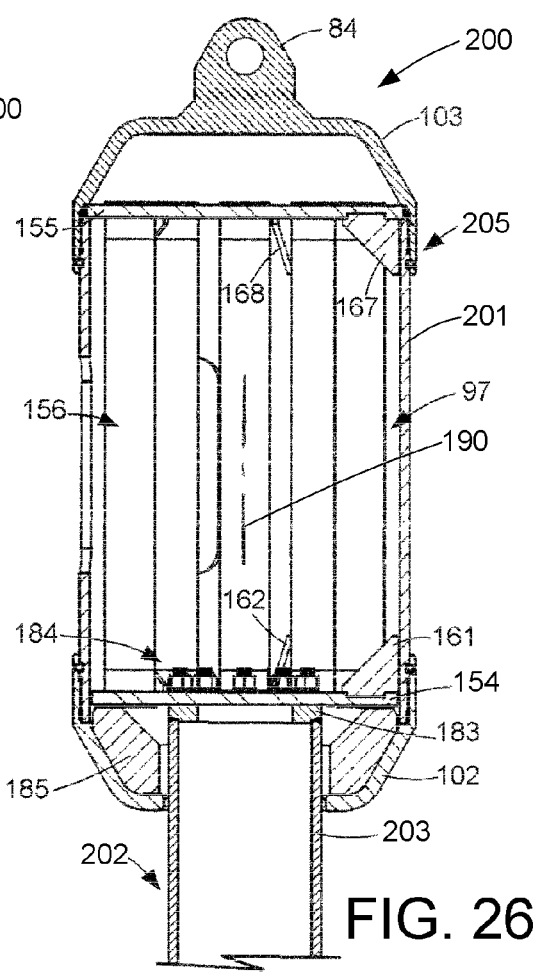
FIG. 26 is a lateral cross-section view corresponding to FIG. 25 but for the case of maximum applied tension.

FIGS. 24, 25, and 26 show views of a shortened load compensator 200 that is similar to the load compensator 80 described above. The shortened load compensator 200 differs from the load compensator 80 because the tension spring assembly 96 has been omitted from the shortened load compensator 200 and the housing 205 and the extension 202 have been shortened by the length that the omitted tension spring assembly 96 has under the maximum tension load. The housing 205 has been shortened by substituting a shorter tube 201 of the housing. The extension 202 has been shortened by substituting a shorter tube 203 of the extension. The extension 202 is bolted to the slotted plate 154 of the tension spring assembly 97. Under the maximum load, as shown in FIG. 26, the slotted plate 154 abuts against the foam crush pad 185. Otherwise, the shortened load compensator 200 is constructed and operates in the same way as the load compensator 80 described above. The stroke of the extension 202 under the maximum tension is reduced by half, and the stiffness of the shortened load compensator 200 is twice the stiffness of the load compensator 80, because the shortened load compensator has a single tension spring assembly 96 contained within the housing 205 instead of two similar tension spring assemblies.

Although the above description has focused on load compensators for load compensation of cranes, it should be apparent that the load compensators described above also may be used as a substitute for conventional mechanical springs or hydraulic or pneumatic cylinders that act as springs in a variety of applications. The load compensators may be added to an existing active or passive load compensation system in order to reduce stiffness or enhance the load compensation of the existing load compensation system. For example, a load compensator as described above may be used not only in-line with a tensioned cable or wire rope, but also with a flying or sliding sheave, or with a nodding boom, or with a winch mounted on rails. These various ways of coupling a load compensator to a load may be used in the same structure for coupling multiple load compensators to the same load. For example, these various ways can be used in the same offshore crane, as further described in Walter Billiot et al., U.S. patent application Ser. No. 14/207,118 filed Mar. 12, 2014, published Sep. 18, 2014 as U.S. 2014/0263142 A1, and entitled Elastomeric Load Compensators for Load Compensation of Cranes, incorporated herein by reference.

In view of the above, there has been described a load compensator including one or more tension spring assemblies that are contained within a tubular housing when tension from a load is applied to the tension spring assemblies. In a preferred construction, the tension springs in each tension spring assembly are elastomeric tension elements. When the load compensator includes more than one tension spring assembly, the tension spring assemblies are mechanically connected to each other in series and stacked in-line with each other in a common tubular housing, so that tension from the load is applied to each tension spring assembly and the load compensator provides an elongation to the load that includes the sum of elongations from each of the tension spring assemblies, and a total stiffness whose reciprocal is the sum of the reciprocals of the individual stiffnesses of the tension spring assemblies. In a preferred construction, each of the tension spring assemblies includes elastomeric tension elements mounted between two disks, and the tubular housing includes a tube and caps attached to the ends of the tube. The load compensator is a compact, convenient, reliable, and relatively lightweight mechanism for load compensation in comparison to the mechanical spring, counterweight, and hydraulic mechanisms that have been used for crane heave compensation. The components of the load compensator have been designed so that a variety of load compensators of different sizes and aspect ratios can be assembled easily using many instances of the same component parts. Therefore many of the same parts can be used to assemble load compensators not only for different sizes and kinds of cranes, but also for a wide range of applications other than load compensation of cranes.

What is claimed is:

1. A load compensator comprising:
a tubular housing comprising at least one cap; and
at least two tension spring assemblies adapted for connection to a load and mechanically connected to each other in series so that tension from the load is applied to each of the tension spring assemblies and the load compensator provides an elongation to the load that includes a sum of elongations from each of the tension spring assemblies, and the tension spring assemblies are stacked in-line with each other in the tubular housing,
wherein at least one of said at least two tension spring assemblies, when a load in excess of a maximum amount of tension is applied to said at least two tension spring assemblies, contacts the at least one cap or an intervening member that is coupled to the at least one cap so that said at least two tension spring assemblies are contained within the tubular housing when a load in excess of the maximum amount of tension is applied to said at least two tension spring assemblies,
wherein each tension spring assembly includes a multiplicity of tension springs mechanically connected in parallel so that elongation of said each tension spring assembly is applied to each of the multiplicity of tension springs in said each tension spring assembly, and the multiplicity of tension springs in said each tension spring assembly provide a restoring force upon the load that is a sum of restoring forces from the multiplicity of tension springs in said each tension spring assembly,
wherein each tension spring assembly includes a first plate and a second plate, and the multiplicity of tension springs in said each tension spring assembly are disposed between the first plate and the second plate, and each of the multiplicity of tension springs in said each tension spring assembly has a first end mechanically connected to the first disk and a second end mechanically connected to the second plate so that elongation between the first plate and the second plate is applied to each of the multiplicity of tension springs in said each tension spring assembly.

2. The load compensator as claimed in claim 1, wherein all of the tension springs in said each tension spring assembly are instances of one kind of component part.

3. The load compensator as claimed in claim 1, wherein each of the tension springs includes an elongated body of elastomer.

4. The load compensator as claimed in claim 1, which further includes a first eyelet mechanically coupled to a first one of said at least two tension spring assemblies, and a second eyelet mounted to the tubular housing, and wherein a second one of said at least two tension spring assemblies is mechanically coupled to the housing so that tension applied to the two eyelets is applied to each of said at least two tension spring assemblies.

5. The load compensator as claimed in claim 4, further including an elongated extension that extends from the tubular housing when the tension is applied to the two eyelets, wherein the first eyelet is mounted to a first end of the extension, and a second end of the extension is fastened to the first one of said at least two tension spring assemblies.

6. The load compensator as claimed in claim 1, further including a crush pad mounted to the housing for crushing by elongation of at least one of said at least two tension spring assemblies when tension applied from the load exceeds a threshold.

7. The load compensator as claimed in claim 6, wherein the tubular housing includes a tube and a cap secured to one end of the tube, and the crush pad is seated in the cap within the housing.

8. A load compensator comprising:
a tubular housing; and
at least one tension spring assembly having a first end adapted for connection to a load and a second end mechanically connected to the tubular housing so that tension from the load is applied to the tension spring assembly,
wherein said at least one tension spring assembly is disposed within the tubular housing and the first end of said at least one tension spring assembly slides against an inner surface of the tubular housing when said at least one tension spring assembly elongates as the tension from the load is applied to the tension assembly, and the tubular housing has a fixed length greater than a length of said at least one tension spring assembly when said at least one tension spring assembly has a maximum elongation under a maximum amount of tension from the applied load so that said at least one tension spring assembly is contained within the tubular housing under the maximum amount of tension from the applied load;

a crush pad mounted to the housing and configured to be crushed and permanently deformed by elongation of said at least one tension spring assembly when tension applied from the load exceeds a threshold.

9. The load compensator as claimed in claim 8, wherein the tubular housing is configured to limit elongation of said at least one tension spring assembly when a load in excess of the maximum amount of tension is applied to said at least one tension spring assembly so that said at least one tension spring assembly is contained within the tubular housing when a load in excess of the maximum amount of tension is applied to said at least one tension spring assembly.

10. The load compensator as claimed in claim 8, wherein each tension spring assembly includes a multiplicity of tension springs mechanically connected in parallel so that elongation of said each tension spring assembly is applied to each of the multiplicity of tension springs in said each tension spring assembly, and the multiplicity of tension springs in said each tension spring assembly provide a restoring force upon the load that is a sum of restoring forces from the multiplicity of tension springs in said each tension spring assembly.

11. The load compensator as claimed in claim 10, wherein all of the tension springs in said each tension spring assembly are instances of one kind of component part.

12. The load compensator as claimed in claim 10, wherein each of the tension springs includes an elongated body of elastomer.

13. The load compensator as claimed in claim 10, wherein each tension spring assembly includes a first plate and a second plate, and the multiplicity of tension springs in said each tension spring assembly are disposed between the first plate and the second plate, and each of the multiplicity of tension springs in said each tension spring assembly has a first end mechanically connected to the first plate and a second end mechanically connected to the second plate so that elongation between the first plate and the second plate is applied to each of the multiplicity of tension springs in said each tension spring assembly.

14. The load compensator as claimed in claim 8, which further includes a first eyelet mechanically coupled to said at least one tension spring assembly, and a second eyelet mounted to the tubular housing, and wherein at least one tension spring assembly is mechanically coupled to the housing so that tension applied to the two eyelets is applied to said at least one tension spring assembly.

15. The load compensator as claimed in claim 14, further including an elongated extension that extends from the tubular housing when the tension is applied to the two eyelets, wherein the first eyelet is mounted to a first end of the extension, and a second end of the extension is fastened to said at least one tension spring assembly.

16. The load compensator as claimed in claim 8, wherein the tubular housing includes a tube and a cap secured to one end of the tube, and the crush pad is seated in the cap within the housing.

17. A load compensator comprising:
a tubular housing; and
at least two tension spring assemblies adapted for connection to a load and mechanically connected to each other in series so that tension from the load is applied to each of the tension spring assemblies and the load compensator provides an elongation to the load that includes a sum of elongations from each of the tension spring assemblies, and the tension spring assemblies are stacked in-line with each other in the tubular housing,
wherein each tension spring assembly includes a multiplicity of tension springs mechanically connected in parallel so that elongation of said each tension spring assembly is applied to each of the multiplicity of tension springs in said each tension spring assembly, and the multiplicity of tension springs in said each tension spring assembly provide a restoring force upon the load that is a sum of restoring forces from the multiplicity of tension springs in said each tension spring assembly,
wherein each tension spring assembly includes a first plate and a second plate, and the multiplicity of tension springs in said each tension spring assembly are disposed between the first plate and the second plate, and each of the multiplicity of tension springs in said each tension spring assembly has a first end mechanically connected to the first plate and a second end mechanically connected to the second plate so that elongation between the first plate and the second plate is applied to each of the multiplicity of tension springs in said each tension spring assembly.

18. The load compensator as recited in claim 17, further comprising a crush pad mounted to the housing and configured to crushed and permanently deformed by elongation of said at least one tension spring assembly when tension applied from the load exceeds a threshold.

* * * * *